US010059272B2

(12) United States Patent
Kim et al.

(10) Patent No.: US 10,059,272 B2
(45) Date of Patent: Aug. 28, 2018

(54) AUTOMOBILE ROOF RACK MADE OF CONTINUOUS FIBER THERMOPLASTIC COMPOSITE

(71) Applicants: Hyundai Motor Company, Seoul (KR); Kia Motors Corp., Seoul (KR); LG Hausys, LTD., Seoul (KR)

(72) Inventors: Hyun Gyung Kim, Hwaseong-si (KR); Seung Mok Lee, Osan-si (KR); Jeong Ho Lee, Suwon-si (KR); Chun Ho Park, Cheongju-si (KR); Sung Jun Hong, Cheongju-si (KR)

(73) Assignees: Hyundai Motor Company, Seoul (KR); Kia Motors Corp., Seoul (KR); LG Hausys, LTD., Seoul (KR)

( * ) Notice: Subject to any disclaimer, the term of this patent is extended or adjusted under 35 U.S.C. 154(b) by 344 days.

(21) Appl. No.: 14/946,498

(22) Filed: Nov. 19, 2015

(65) Prior Publication Data

US 2016/0318557 A1 Nov. 3, 2016

(30) Foreign Application Priority Data

Apr. 28, 2015 (KR) ........................ 10-2015-0059608

(51) Int. Cl.
*B60R 9/04* (2006.01)

(52) U.S. Cl.
CPC ..................................... *B60R 9/04* (2013.01)

(58) Field of Classification Search
CPC ................................. B60R 9/04; B60R 9/052
See application file for complete search history.

(56) References Cited

FOREIGN PATENT DOCUMENTS

| | | | | |
|---|---|---|---|---|
| JP | 9-175280 | A | | 7/1997 |
| JP | 10-129359 | A | | 5/1998 |
| JP | 2013-933 | A | | 1/2013 |
| KR | 10-2009-0095131 | A | | 9/2009 |
| KR | 10-2014-0043318 | A | | 4/2014 |
| KR | 10-2015-0004987 | A | | 1/2015 |
| KR | 20150085577 | A | * | 7/2015 |

* cited by examiner

*Primary Examiner* — Corey Skurdal
(74) *Attorney, Agent, or Firm* — Morgan, Lewis & Bockius LLP

(57) ABSTRACT

An automobile roof rack made of a continuous fiber thermoplastic composite may include a resin body having a roof rack shape, and an insert-reinforcing layer formed on an inner surface of the resin body to be integrated with the resin body into a single body and made of a continuous fiber thermoplastic composite (CFT).

11 Claims, 4 Drawing Sheets

A
A
102
100
102

AUTOMOBILE ROOF RACK MADE OF CONTINUOUS FIBER THERMOPLASTIC COMPOSITE

CROSS REFERENCE TO RELATED APPLICATION

The present application claims priority to Korean Patent Application No. 10-2015-0059608, filed Apr. 28, 2015, the entire contents of which is incorporated herein for all purposes by this reference.

BACKGROUND OF THE INVENTION

Field of the Invention

The present invention relates to an automobile roof rack made of a continuous fiber thermoplastic composite and, more particularly, to an automobile roof rack made of a continuous fiber thermoplastic composite that can reduce weight and production cost of a roof rack and improve mechanical properties of a roof rack.

Description of Related Art

Automobile users typically use a car trunk to transport objects but sometimes use a roof rack to carry long or bulky items that are too large to be accommodated in a car trunk.

A roof rack is a convenient apparatus mounted on a vehicle. It is a set of bars secured to a roof panel of a car. It is used to carry bulky items or leisure equipment such as camping gear or skis. Such roof racks are recently in wide use due to the popularity of sport utility vehicles (SUV).

A roof module for a vehicle, as illustrated in FIG. 1, includes a front filler 1 which is an upper structure of a vehicle, a center filter 2, a rear filler 3, roof rails 6, a front roof cross member 4, a center roof cross member 5, a rear roof cross member 7, and a roof panel 8. A pair of roof racks 9 is attached to left and right edges of the roof panel 8.

Recently in the automobile industry, a design in which a car body is made of an aluminum alloy, a magnesium alloy, or a carbon fiber-reinforced plastic to increase fuel efficiency has attracted attention, and the number of patent applications for technologies related to such a design is increasing.

Specifically, with tightening of regulations on $CO_2$ emissions, a design in which a car body is made of a lightweight material is increasingly used by automobile manufacturers. Accordingly, technologies related to convenient parts such as a roof rack are increasingly being developed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an automobile roof rack made of a continuous fiber thermoplastic composite. The automobile roof rack is more lightweight than conventional aluminum alloy roof racks, can be produced at low production cost, and has good mechanical properties and structural stiffness. Because of these advantages, the automobile roof rack of the present invention has good marketability.

Additionally, various aspects of the present invention are directed to providing an automobile roof rack made of a continuous fiber thermoplastic composite that can increase coherence of a reinforcing protrusion that is used to maintain structural stiffness of a roof rack when performing insert injection molding to form a resin body and an insert-reinforcing layer made of a continuous fiber thermoplastic composite.

According to various aspects of the present invention, an automobile roof rack made of a continuous fiber thermoplastic composite may include a resin body having a roof rack shape, and an insert-reinforcing layer formed on an inner surface of the resin body to be integrated with the resin body into a single body and made of a continuous fiber thermoplastic composite (CFT).

The automobile roof rack may further include a plurality of reinforcing protrusions that is formed on and integrated with one surface of the insert-reinforcing layer and is arranged at intervals in a lengthwise direction of the roof rack.

The roof rack including the resin body, the insert-reinforcing layer, and the reinforcing protrusions may have a "U" shape that is open on one side.

An opening of the roof rack is disposed near a roof panel, forming a closed space between the roof rack and the roof panel.

An end of the reinforcing protrusion may be provided with a reinforcing recess that has an opening near the resin body, in which a connection to be inserted into the reinforcing recess may be formed in the insert-reinforcing layer, and mating between the reinforcing recess and the connection protrusion enhances coherence between the insert-reinforcing layer and the reinforcing protrusion.

The reinforcing recess may be tapered to a bottom thereof and may have a shape in which a diameter thereof decreases toward the bottom from an entrance portion thereof, thereby enhancing coherence between the reinforcing recess and the connection protrusion.

The insert-reinforcing layer may be separately manufactured from the resin body, then put into an injection mold, and finally insert-molded along with the resin body and the reinforcing protrusion so that the resin body, the insert-reinforcing layer, and the reinforcing protrusion are integrated with each other to become a single body, forming the roof rack.

When forming the reinforcing protrusions on one side of the insert-reinforcing layer through an injection molding process, the connection protrusion of the insert-reinforcing layer may be inserted into the reinforcing recess of the reinforcing protrusion.

The resin body may be made of a material having a composition containing 50 to 70 weight % of nylon 6, 30 to 50 weight % of mineral glass fiber (MGF), and minimal impurities.

The resin body may be made of a material having a composition containing 60 weight % of nylon 6 and 40 weight % of mineral glass fiber (MGF).

The insert-reinforcing layer made of a continuous fiber thermoplastic composite may be made of a material having a composition containing 40 to 60 weight % of nylon 6, 40 to 60 weight % of glass fiber (GF), and minimal impurities.

The insert-reinforcing layer made of a continuous fiber thermoplastic composite may be made of a material having a composition containing 50 weight % of nylon 6 and 50 weight % of glass fiber (GF).

The insert-reinforcing layer may have a thickness of 0.6 to 1.3 mm.

According to the present invention, since an automobile roof rack is composed of a resin body and an insert-reinforcing layer made of a continuous fiber thermoplastic composite having good mechanical properties, the roof rack is lightweight and can be produced at low production cost.

Furthermore, since coherence between the resin body and the insert-reinforcing layer made of a continuous fiber thermoplastic composite is enhanced when insert injection molding is performed, the roof rack has enhanced structural stiffness and good marketability.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
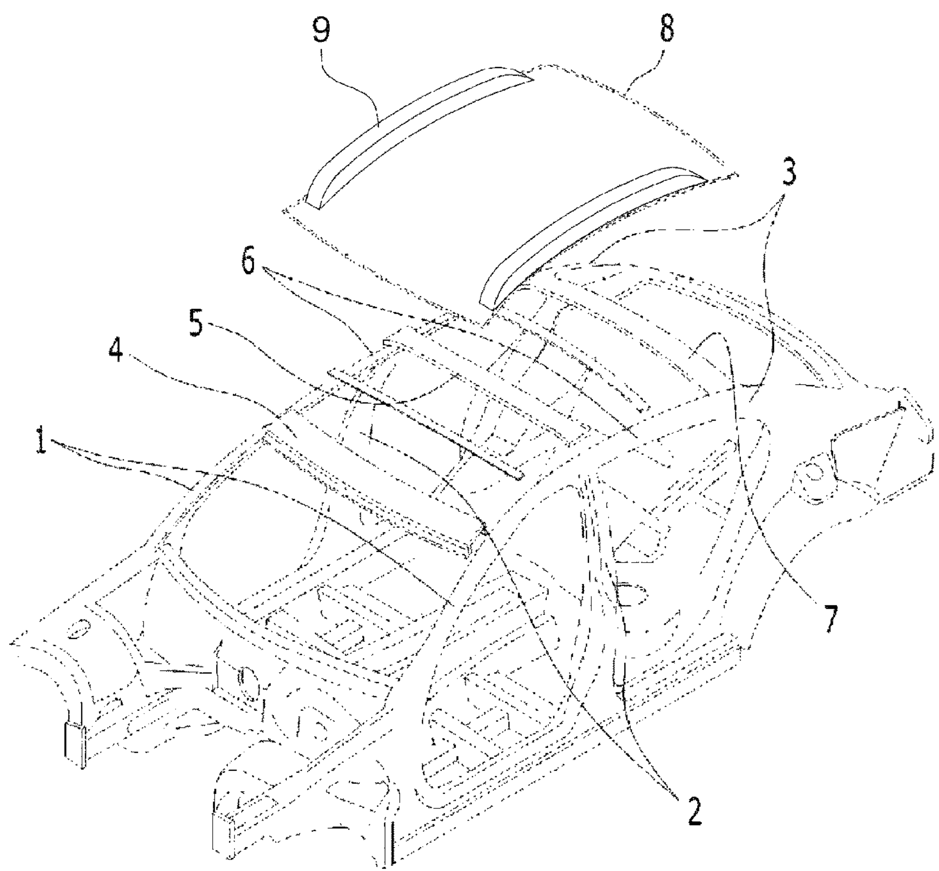
FIG. 1 is a perspective view illustrating an upper structure of an automobile according to the related art.
Figure 2:
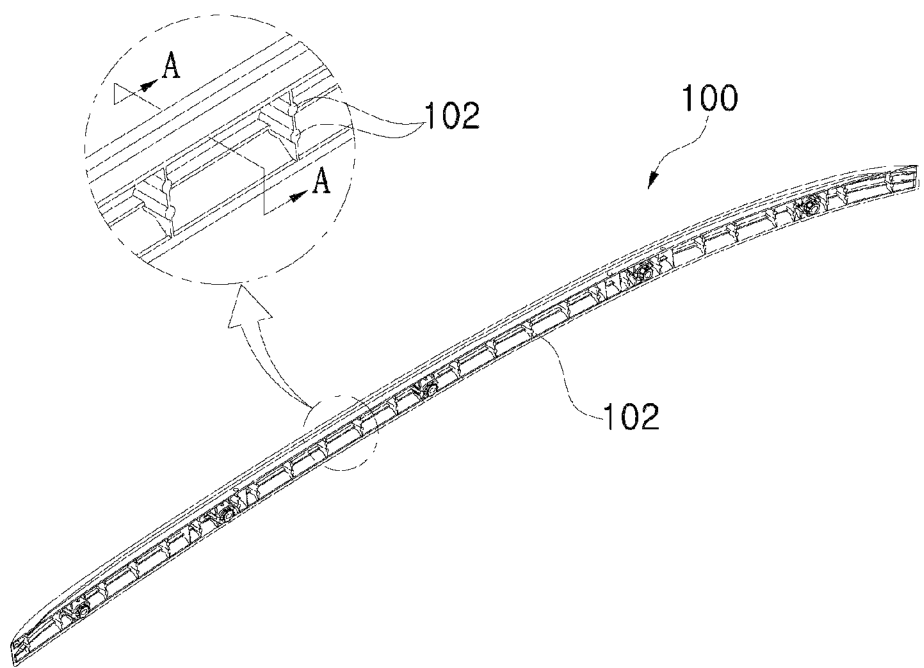
FIG. 2 is a perspective view illustrating an exemplary automobile roof rack made of a continuous fiber thermoplastic composite according to the present invention.
Figure 3:
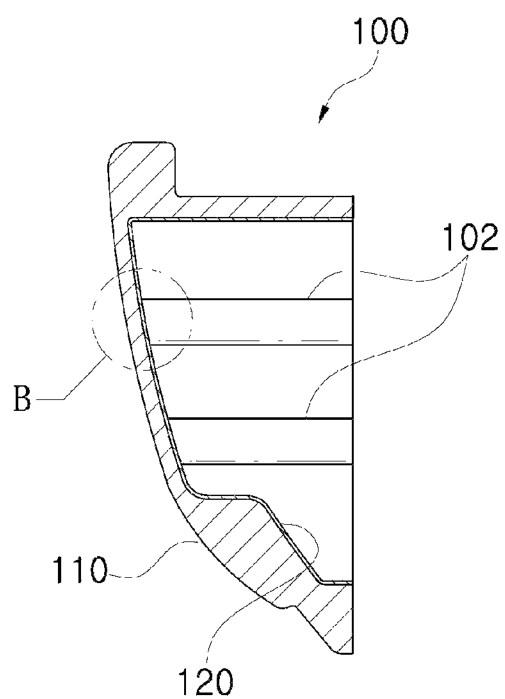
FIG. 3 is a cross-sectional view taken along a line A-A of FIG. 2.
Figure 4:
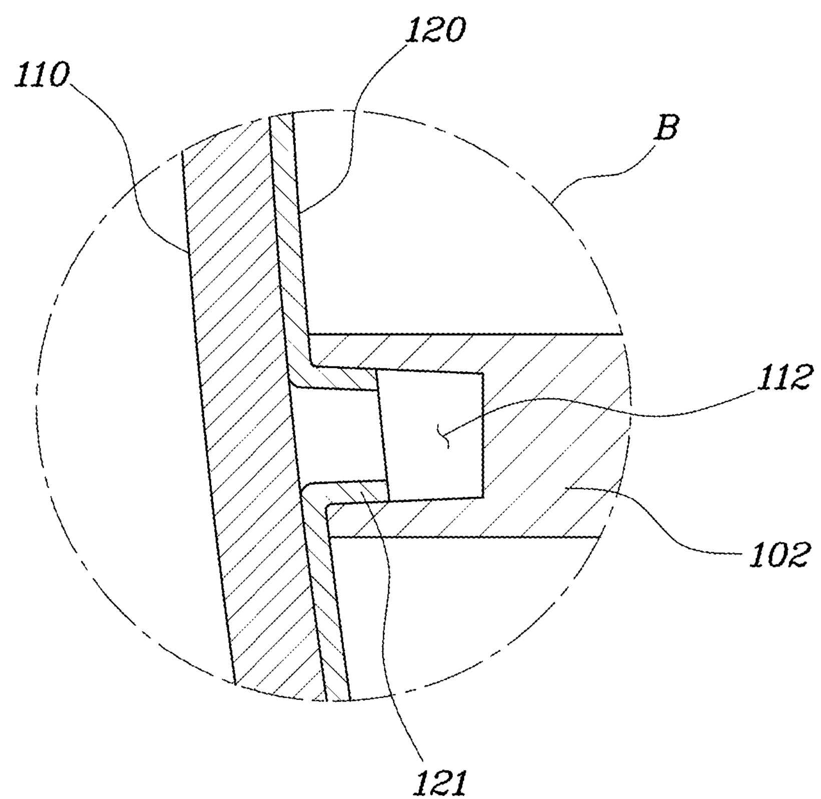
FIG. 4 is a cross-sectional view illustrating a portion B of FIG. 3 and demonstrating a reinforcing protrusion according to the present invention.

As illustrated in FIG. 2 to FIG. 4, an automobile roof rack made of a continuous fiber thermoplastic composite according to various embodiments of the present invention includes a resin body 110 that is made of a resin and has the shape of a typical roof rack, and an insert-reinforcing layer 120 that is made of a continuous fiber thermoplastic composite (CFT) and formed on one surface of the resin body 110 through an insert injection molding process.

The automobile roof rack 100 is a complete product produced through insert injection molding. In the automobile roof rack 100, the insert-reinforcing layer 120 is formed on an inner surface of the resin body 110. That is, the insert-reinforcing layer 120 and the resin body 110 are integrated with each other to become a single body.

The roof rack 100 has a letter "U" shape that is open on one side. Therefore, the automobile roof rack 100 is more lightweight than conventional roof racks.

In addition, an inner surface of the roof rack 100 is provided with a plurality of reinforcing protrusions 102. Therefore, stiffness of the roof rack 100 is enhanced.

The automobile roof rack 100 according to the present invention, which is composed of the resin body 110 and the insert-reinforcing layer 120 made of a continuous fiber thermoplastic composite, has a letter "U" shape that is open on one side. Therefore, the automobile roof rack 100 has an advantage of being lightweight. In addition, when an opening of the roof rack 100 is disposed near a roof panel (e.g., roof panel 8 of the prior art), a closed space may be formed between the roof rack 100 and the roof panel 8.

The reinforcing protrusions 120 are simultaneously injection-molded along with the resin body 110.

That is, the insert-reinforcing layer 120, which is a separate member from the resin body 110, is put into an injection mold, and the resin body 110 and the reinforcing protrusions 102 are injection molded on inner and outer surfaces of the insert-reinforcing layer 120, respectively. In this way, the automobile roof rack 100, in which the resin body 110, the insert-reinforcing layer 120, and the reinforcing protrusions 102 are integrated with each other to become a single body, can be manufactured.

The reinforcing protrusions 102 push the insert-reinforcing layer 120 toward the resin body 110, so that strong coherence between the resin body 110 and the insert-reinforcing layer 120 can be maintained.

The resin body 110 may be made of glass fiber, natural fiber, carbon fiber, aramid fiber, ultrahigh molecular weight polyethylene (UNMWPE) fiber. The resin body 110 may be made of polyamide. Preferably, the resin body 110 may be made of nylon 6 or nylon 66. Specifically, the resin body 110 may be made of a material having a composition including 50 to 70 weight % of polyamide, preferably single fiber nylon 6 or single fiber nylon 66, 30 to 50 weight % of mineral glass fiber (MGF), and inevitable impurities. More preferably, the composition may include 60 weight % of nylon 6 and 40 weight % of mineral glass fiber.

The resin body 110 may have various cross-sectional shapes, thicknesses, and profiles. For reference, the nylon 6 is produced by synthesizing ε-caprolactam and then subjecting ε-caprolactam to ring-opening polymerization. Since ε-caprolactam having 6 carbon molecules undergoes ring-opening polymerization, it produces a polymer. The polymer is called nylon 6 and has a chemical formula of $C_{10}H_2O(CO)_2(NH)_2$.

The insert-reinforcing layer 120 may be made of a material having higher stiffness than the resin body 110. That is, a material in which the content of a fiber composite is higher than that in the resin body 110 may be used.

The continuous fiber thermoplastic composite (CFT) may contain 40 to 60 weight % of polyamide (preferably nylon 6 or nylon 66 and more preferably single fiber nylon 6, 40 to 60 weight % of glass fiber (GF), and inevitable impurities. Preferably, it may contain 50 weight % of nylon 6 and 50 weight % of glass fiber (GF).

In addition, the insert-reinforcing layer 120 preferably has a thickness of 0.6 to 1.3 mm.

The insert-reinforcing layer 120 enables the automobile roof rack 100 to have sufficient stiffness. For this purpose, the insert-reinforcing layer 120 preferably has a thickness of 0.6 to 1.3 mm. When the thickness is less than 0.6 mm, the effect of enhancing the stiffness of the roof rack 100 is not dramatic. On the other hand, when the thickness is greater than 1.3 mm, it has a negative effect of excessively increasing the weight of a roof rack despite increasing the stiffness of the roof rack. The increased weight results in deterioration of fuel efficiency and an increase in production cost. Therefore, in this case, the negative effect surpasses the positive effect.

The insert-reinforcing layer 120 undergoes a pre-forming process before insert injection molding. That is, fabric of a continuous fiber thermoplastic composite is prepared first and then primarily heated to about 225° C. The heated fabric is stacked in two or more layers.

The stacked fabric layers are secondarily heated to about 225° C. Next, the resin body 110 and the reinforcing protrusions 102 are insert-injection-molded on respective sides of the insert-reinforcing layer 120 so that the resin body 110, the reinforcing protrusions 102, and the insert-reinforcing layer 120 are integrated with each other to become a single body.

The reinforcing protrusions 102 not only enhance coherence between the resin body 110 and the insert-reinforcing layer 120 but also prevent the roof rack 100 extending in a lengthwise direction of a vehicle from bending or twisting.

When forming the reinforcing protrusions 102 through injection molding, an end of the reinforcing protrusion 102 that is near the resin body 110 is provided with a reinforcing recess 112. A connection protrusion 121 of the insert-reinforcing layer 120 is inserted into the reinforcing recess 112.

In order to enhance coherence between the reinforcing recess 112 and the connection protrusion 121, the reinforcing recess 112 is tapered to the bottom, as illustrated in FIG. 4. That is, the diameter of the reinforcing recess 112 decreases toward the bottom from an entrance portion of the reinforcing recess 112.

The reinforcing recess 112 has a structure in which the diameter thereof decreases from the entrance portion side (left side of FIG. 4) to the bottom side (right side of FIG. 4).

Therefore, when putting the insert-reinforcing layer 120, which is a separate member, into an injection mold and performing injection molding to form the resin body 100 and the reinforcing protrusions 102 on respective sides of the insert-reinforcing layer 120, the connection protrusion 121 of the insert-reinforcing layer 120 is inserted into the reinforcing recess 112. Therefore, not only the coherence between the insert-reinforcing layer 120 and the reinforcing protrusion 102 is enhanced but also the coherence between the resin body 110 and the insert-reinforcing layer 120 is enhanced due to the reinforcing protrusion 102.

Accordingly, the automobile roof rack 100 that is prepared by forming the resin body 110 and the insert-reinforcing layer 120 made of a continuous fiber thermoplastic composite through injection molding has good mechanical properties, is lightweight, and can be produced at low production cost.

Furthermore, since a plurality of reinforcing protrusions 102 is formed on an inner surface of the resin body 110 and arranged at intervals in a lengthwise direction of the resin body, it is possible to prevent the roof rack 100 that extends in the lengthwise direction from bending and twisting and to enhance structural stiffness of the roof rack 100.

In addition, since the connection protrusion 121 of the insert-reinforcing layer 120 is inserted into the reinforcing recess 112 when putting the insert-reinforcing layer 120, which is a separate member, into an injection mold and forming the resin body 110 and the reinforcing protrusions 102 through injection molding on respective sides of the insert-reinforcing layer 120, not only the coherence between the insert-reinforcing layer 120 and the reinforcing protrusion 102 is enhanced but also the coherence between the resin body 110 and the insert-reinforcing layer 120 is enhanced due to the reinforcing protrusion 102. Therefore, the structural stiffness of the roof rack is enhanced, and marketability of the roof rack is improved.

In addition, since the automobile roof rack 100 has a letter "U" shape that is open on one side, the automobile roof rack 100 is lightweight. Furthermore, since the opening of the automobile roof rack 100 is disposed near the roof panel 8, a closed space is formed between the automobile roof rack 100 and the roof panel 8. This structure also enhances the structural stiffness of the automobile roof rack 100 when it is secured to the roof panel 8.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automobile roof rack made of a continuous fiber thermoplastic composite, the automobile roof rack comprising:

a resin body having a roof rack shape;

an insert-reinforcing layer formed on an inner surface of the resin body to be integrated with the resin body into a single body and made of a continuous fiber thermoplastic composite (CFT); and a plurality of reinforcing protrusions that is formed on and integrated with one surface of the insert-reinforcing layer and is arranged at intervals in a lengthwise direction of the roof rack, wherein an end of the reinforcing protrusion is provided with a reinforcing recess that has an opening near the resin body, wherein a connection to be inserted into the reinforcing recess is formed in the insert-reinforcing layer, and wherein mating between the reinforcing recess and the connection protrusion enhances coherence between the insert-reinforcing layer and the reinforcing protrusion.

2. The automobile roof rack according to claim 1, wherein the roof rack including the resin body, the insert-reinforcing layer, and the reinforcing protrusions has a "U" shape that is open on one side.

3. The automobile roof rack according to claim 2, wherein an opening of the roof rack is disposed near a roof panel, forming a closed space between the roof rack and the roof panel.

4. The automobile roof rack according to claim 1, wherein the reinforcing recess is tapered to a bottom thereof and has a shape in which a diameter thereof decreases toward the bottom from an entrance portion thereof, thereby enhancing coherence between the reinforcing recess and the connection protrusion.

5. The automobile roof rack according to claim 1, wherein the insert-reinforcing layer is separately manufactured from the resin body, then put into an injection mold, and finally insert-molded along with the resin body and the reinforcing protrusion so that the resin body, the insert-reinforcing layer, and the reinforcing protrusion are integrated with each other to become a single body, forming the roof rack.

6. The automobile roof rack according to claim wherein when forming the reinforcing protrusions on one side of the insert-reinforcing layer through an injection molding process, the connection protrusion of the insert-reinforcing layer is inserted into the reinforcing recess of the reinforcing protrusion.

7. The automobile roof rack according to claim 2, wherein the resin body comprises a material having a composition containing 50 to 70 weight % of nylon 6, 30 to 50 weight % of mineral glass fiber (MGF), and minimal impurities.

8. The automobile roof rack according to claim 2, wherein the resin body comprises a material having a composition containing 60 weight % of nylon 6 and 40 weight % of mineral glass fiber (MGF).

9. The automobile roof rack according to claim 2, wherein the insert-reinforcing layer made of a continuous fiber thermoplastic composite comprises a material having a composition containing 40 to 60 weight % of nylon 6, 40 to 60 weight % of glass fiber (GF), and minimal impurities.

10. The automobile roof rack according to claim 2, wherein the insert-reinforcing layer made of a continuous fiber thermoplastic composite comprises a material having a composition containing 50 weight % of nylon 6 and 50 weight % of glass fiber (GF).

11. The automobile roof rack according to claim 2, wherein the insert-reinforcing layer has a thickness of 0.6 to 1.3 mm.

* * * * *